US007574401B1

(12) United States Patent
Burns

(10) Patent No.: US 7,574,401 B1
(45) Date of Patent: Aug. 11, 2009

(54) STUDENT LOAN CONSOLIDATION QUALIFICATION SYSTEM AND METHOD OF OPERATION THEREOF

(75) Inventor: Arthur Dale Burns, 6609 Shadow Crest, Plano, TX (US) 75093

(73) Assignee: Arthur Dale Burns, St. Petersburg, FL (US)

( * ) Notice: Subject to any disclaimer, the term of this patent is extended or adjusted under 35 U.S.C. 154(b) by 1307 days.

(21) Appl. No.: 09/603,510

(22) Filed: Jun. 26, 2000

(51) Int. Cl.
*G06Q 40/00* (2006.01)

(52) U.S. Cl. ............................................ 705/38; 705/1

(58) Field of Classification Search ................... 705/38, 705/1; 902/22
See application file for complete search history.

(56) References Cited

U.S. PATENT DOCUMENTS 5,689,650 A * 11/1997 McClelland et al. .......... 705/36
5,745,885 A * 4/1998 Mottola et al. ................ 705/36
5,765,144 A * 6/1998 Larche et al. ................. 705/38
5,930,776 A * 7/1999 Dykstra et al. ................ 705/35
5,940,812 A * 8/1999 Tengel et al. .................. 705/38
6,128,599 A * 10/2000 Walker et al. ............... 235/380
6,208,979 B1 * 3/2001 Sinclair ......................... 705/1
6,233,566 B1 * 5/2001 Levine et al. ................. 705/37

OTHER PUBLICATIONS

Computer Dictionary; 1997; Microsoft Press; Third Edition; p. 313 and 506.*

* cited by examiner

*Primary Examiner*—Alain L. Bashore

(57) ABSTRACT

A student loan consolidation qualification system and method of operating the same. In one embodiment, the student loan consolidation qualification system includes: (1) an input module, associated with an Internet site, that presents at least one page to a loan applicant to assist the loan applicant in providing personal and student loan information pertaining to a plurality of student loans made to the loan applicant and (2) a qualification module, associated with the input module, that assesses the personal information to determine a personal qualification of the loan applicant and assesses the student loan information pertaining to the plurality of student loans to determine a loan qualification of the loan applicant, the qualification module qualifying the loan applicant and informing the loan applicant and a loan consolidator only if the personal qualification and the loan qualification are positive.

18 Claims, 6 Drawing Sheets

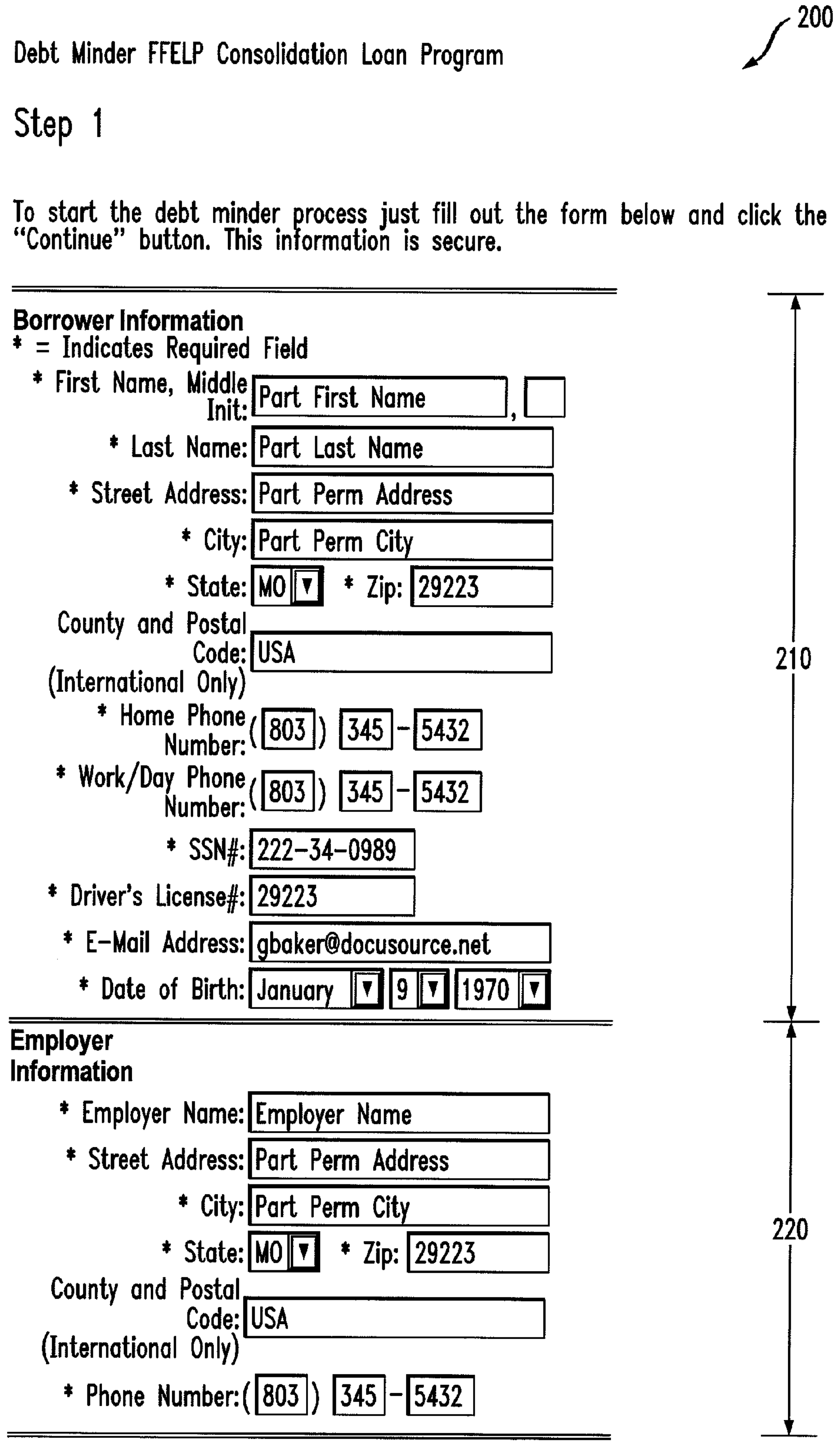

FIG. 2A

Debt Minder FFELP Consolidation Loan Program   ⟋ 200

Step 1

To start the debt minder process just fill out the form below and click the "Continue" button. This information is secure.

Borrower Information
\* = Indicates Required Field

* First Name, Middle Init: [Part First Name] , [ ]
* Last Name: [Part Last Name]
* Street Address: [Part Perm Address]
* City: [Part Perm City]
* State: [MO ▼]  * Zip: [29223]
County and Postal Code: [USA]
(International Only)
* Home Phone Number: ([803]) [345]-[5432]
* Work/Day Phone Number: ([803]) [345]-[5432]
* SSN#: [222-34-0989]
* Driver's License#: [29223]
* E-Mail Address: [gbaker@docusource.net]
* Date of Birth: [January ▼] [9 ▼] [1970 ▼]

← 210

Employer Information

* Employer Name: [Employer Name]
* Street Address: [Part Perm Address]
* City: [Part Perm City]
* State: [MO ▼]  * Zip: [29223]
County and Postal Code: [USA]
(International Only)
* Phone Number: ([803]) [345]-[5432]

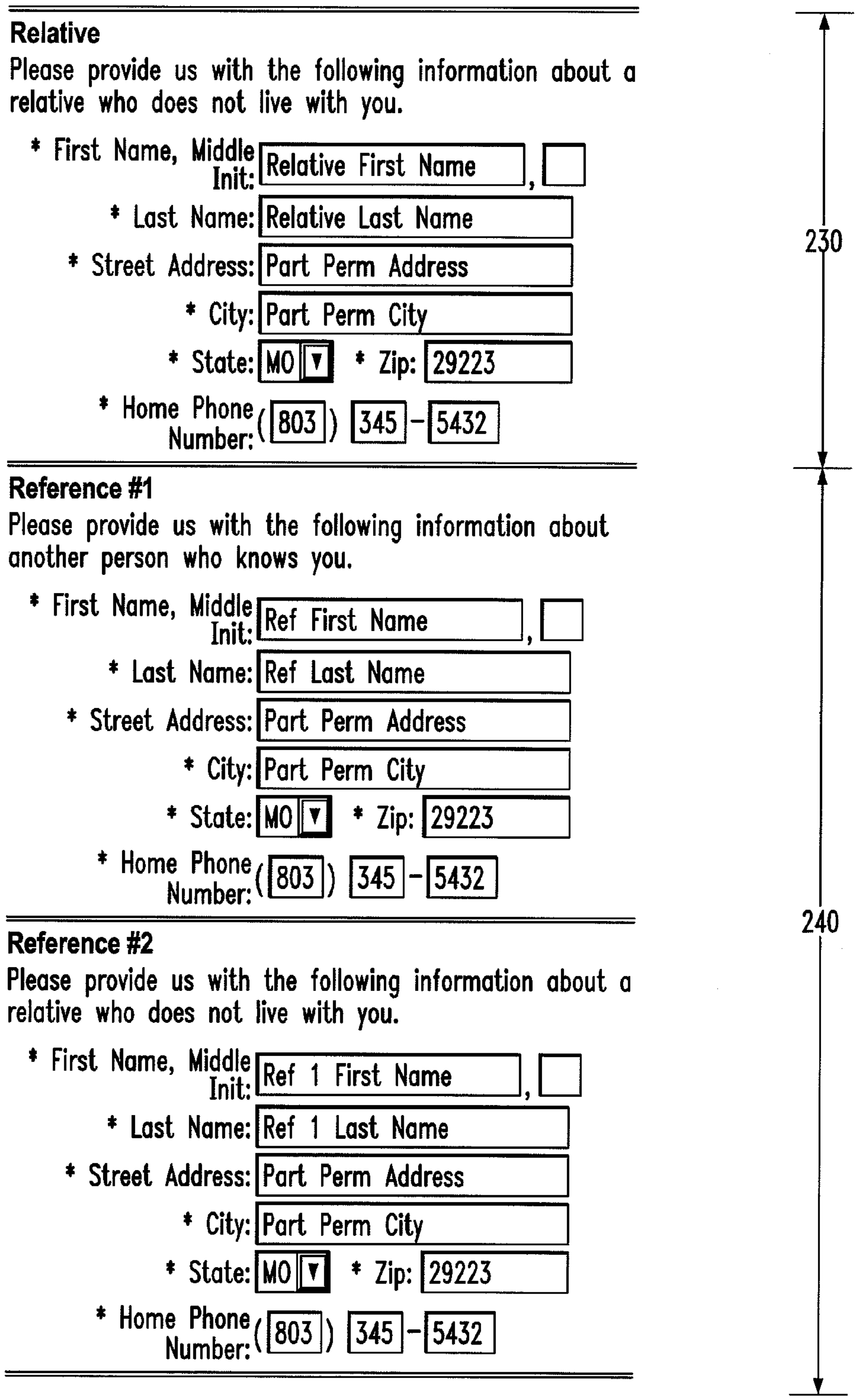

Relative

Please provide us with the following information about a relative who does not live with you.

* First Name, Middle Init: [Relative First Name], [ ]
* Last Name: [Relative Last Name]
* Street Address: [Part Perm Address]
* City: [Part Perm City]
* State: [MO ▼]  * Zip: [29223]
* Home Phone Number: ([803]) [345]-[5432]

Reference #1

Please provide us with the following information about another person who knows you.

* First Name, Middle Init: [Ref First Name], [ ]
* Last Name: [Ref Last Name]
* Street Address: [Part Perm Address]
* City: [Part Perm City]
* State: [MO ▼]  * Zip: [29223]
* Home Phone Number: ([803]) [345]-[5432]

Reference #2

Please provide us with the following information about a relative who does not live with you.

* First Name, Middle Init: [Ref 1 First Name], [ ]
* Last Name: [Ref 1 Last Name]
* Street Address: [Part Perm Address]
* City: [Part Perm City]
* State: [MO ▼]  * Zip: [29223]
* Home Phone Number: ([803]) [345]-[5432]

Debt Minder FFELP Consolidation Loan Program

Step 2

310

Just use the form below to add all of your outstanding student loans (regardless of loan type) to your Worksheet. These include loans from banks, credit unions, schools, associations, or private loan programs used to finance your education. Do <u>Not</u> include personal loans from family and friends. Once you have finished add loaning click "Continue" to select the loans you wish to consolidate.

| Loan Type | Lender/Servicer | Current Interest Rate (%) | Current Balance | |
|---|---|---|---|---|
| Perkins Loans | sds<br>3205<br>DFW, AZ 75093 | 6.25 | $10,000.00 | Delete |
| Plus Loans (parent loans only) | adb<br>3020<br>DFW, CO 75093 | 8.25 | $10,000.00 | Delete |
| Total Balance | | | $20,000.00 | |

325 Add Loan Continue 330

Complete the form below and click the "Add Loan" button to add a loan to your worksheet. * = Indicates Required Field

320

*Guarantor:

*Account Number:

*Lender/Servicer:

* Street Address:

* City:

* State: – * Zip:

* Balance:

*Interest Rate (%):

* Loan Type: Select Type

* ☐ Loan is in Grace/Repayment Status.

FFELP Consolidation Loan Program

Step 3 Choose Loans
Select the loans you want to consolidate by checking the "Con.?" box next to the loan. You can experiment with different combinations by checking different loans. Once you have found a combination you are happy with select a repayment method and click "Continue".

410

| Loan Type | Con.? | Lender/Servicer | Current Interest Rate (%) | Current Balance |
|---|---|---|---|---|
| Perkins Loans | ☑ | sds | 6.25 | $10,000.00 |
| Plus Loans (parent loans only) | ☑ | adb | 8.25 | $10,000.00 |
| Total Balance of all education loans | | | | $20,000.00 |

420

Your repayment terms.
Your repayment terms will be based upon the higher of the total balance of all your outstanding education loans, or twice the balance of your loans that are eligible for consolidation.

FFELP Consolidation Loan Balance: $20000.00 — 430

Your Maximum Repayment Term: 20 Years (240 Months) — 440

Your New Interest Rate

Your new interest rate will be the weighted average of the loans you selected for consolidation rounded up to the nearest whole percent.

A. Computation Balance: $1450.00 *

B. Current Balances: $20000.00 *

Weighted average interest rate (a/b): 7.25 %* — 450

Your Repayment Options
You will have a choice of four flexible payment plans. You should select the plan that allows you to repay your loan in the way that is most affordable for you.

- ⦿ None Selected
- ○ Option 1: Equal Payments
- ○ Option 1: Graduated

460

STUDENT LOAN CONSOLIDATION QUALIFICATION SYSTEM AND METHOD OF OPERATION THEREOF

TECHNICAL FIELD OF THE INVENTION

The present invention is directed, in general, to loan processing and, more specifically, to a computer and Internet based student loan consolidation qualification system and method of operating the same.

BACKGROUND OF THE INVENTION

A large percentage of America's working population is attending undergraduate and/or graduate school before embarking on a career. In many cases, the only way an individual is able to pursue such an education is by borrowing funds while he or she is in school. If the student does not borrow the funds, then the student's parents may do so. The financial burden on the student and his or her parents is always substantial and frequently overwhelming. This is particularly true for families who are educating more than one person at the same time. The result is that a significant segment of the population enters the work force burdened with substantial loans that were incurred during his or her educational process.

In order to make funds available to students, most student loans are guaranteed or otherwise supported by various government sponsored programs. Because such loans are usually unsecured, this is the only way that financial institutions will make funds available for such loans, since they are generally unwilling to otherwise extend unsecured credit to a student with no assets and no work or credit history. The fact that nearly all student loans are insured or guaranteed under one government program or another also means the interest rates charged on such loans will be more favorable to the borrower than would a comparable unsecured loan made by a financial institution. Loans made under a government sponsored program will often provide other benefits to the borrower, such as tolling amortization of the loan while the student is attending school and subsidizing the loan interest.

Notwithstanding the benefits offered by government sponsored student loan programs, the resultant financial burden on the student or former student is substantial. Although the student is not required to amortize the loan while he or she is still a student, the loan may continue to accrue interest at compound rates. If the student continues his or her education beyond the undergraduate level, it may be several years before the obligation to amortize the loan commences. It is not uncommon, for example, for a student to secure a loan during the first year of his or her undergraduate education and have the obligation more than double by the time the amortization period commences.

Because the student or the student's parents normally only takes out loans as needed, they will shop for what they perceive to be the best terms available at that time. In addition, some educational institutions have a preferred or exclusive list of lenders available to that institution. A student that attends multiple educational institutions will be required to use specific lenders that may differ from institution to institution. For this reason, a student, or his parents, will frequently find they have multiple loan obligations outstanding when the time to amortize such loans commences. This also means that it is more probable than not that more than one lender will be involved and that loans will be insured or guaranteed under more than one government-sponsored program. The situation is further complicated by the fact that some of the loans may be the sole obligation of the student, while others will be guaranteed by a third party, typically the student's parents.

As a result of the substantial debt obligation incurred by most former students, when the time to amortize the obligations commences, the monthly payments will frequently be substantially more than can be supported by the former student's compensation. One way such a former student can handle the debt load is to consolidate his or her student loans into a single loan and extend the amortization period. The consolidation combined with an amortization extension usually permits the monthly payments to be reduced to a manageable level. Until recently, it has been difficult for a former student to combine or consolidate all of his or her student loans into a single loan package. This was because no provision existed for maintaining government insurance or guarantees in place, if an unrelated lender made a consolidation loan. That is, if a former student had a loan from one financial institution and borrowed from another to pay the original loan off, the new loan was not qualified to be covered by a government sponsored program. Because most students had loans from multiple lenders, the lenders available to consolidate loans were limited.

Although the law has been changed to allow unrelated financial institutions to consolidate student loans without losing the insurance or guarantee benefits provided by government sponsored student loan programs, a potential loan applicant must still expend considerable effort in gathering information and seeking out a lender willing to consolidate the student loans. Even if a lender is found who is willing to consolidate student loans, in many cases the effort required to secure the consolidated loan discourages a loan applicant. In most cases, the loan applicant must gather the student loan information, complete the loan application for the potential lender, submit the application, and wait to find out if the consolidation loan has been approved or rejected by the lending institution. Because it is not unusual for errors to be made on the application, many applications are rejected for that reason alone. Such a rejection requires the loan applicant to start the process over again. It is also not unusual for a loan applicant to be not qualified to receive a consolidated student loan for any one of a number of possible reasons. In some cases, the reason for disqualification is curable, which requires the loan process to be started all over again. In short, the entire loan procedure to secure a consolidated student loan is time consuming and, in many cases, repetitive.

The process is further complicated by financial institution indifference. Because student loans made pursuant to a government sponsored program will typically produce a very low yield to the lending financial institution, it is more advantageous for a financial institution to seek out and make loans to parties where a higher yield can be achieved, such as loans to commercial borrowers. Little financial incentive exists for most financial institutions to seek out and assist former students in consolidating their student loans.

Accordingly, what is needed in the art is a student loan consolidation qualification system and method of operating the same. The system should be easy to use and provide prompt feedback to a potential loan applicant.

SUMMARY OF THE INVENTION

To address the above-discussed deficiencies of the prior art, the present invention provides a student loan consolidation qualification system and method of operating the same. In one embodiment, the student loan consolidation qualification system includes: (1) an input module, associated with an Internet site, that presents at least one page to a loan applicant to assist the loan applicant in providing personal and student loan information pertaining to a plurality of student loans made to the loan applicant and (2) a qualification module, associated with the input module. The qualification module assesses the personal information to determine the personal qualification of the loan applicant. The qualification module also assesses the student loan information pertaining to the plurality of student loans to determine a loan qualification. The qualification module informs the loan applicant and a loan consolidator only if the personal qualification and loan qualification are positive.

The present invention enjoys substantial utility by greatly decreasing the effort that would have otherwise have been required to gather information from, and qualify, loan applicants for consolidation of their student loans. It permits the loan applicant to enter required information and receive near instantaneous feedback on whether all the necessary information has been supplied and whether the loan applicant is a potentially suitable candidate for a consolidation loan.

In one embodiment of the present invention, the Internet web site is associated with an affinity group. This is advantageous to members of the affinity group, because the consolidation loan product will have been reviewed and passed on by the affinity group before information about it is posted on the affinity group web site. Yet another aspect of the invention provides for the Internet web site to be a secure site.

In another embodiment of the present invention, the personal information includes student loan guarantor information. This is beneficial because it permits processing of a completed application with all relevant information. Another aspect of the present invention provides for the qualification module to assess the loan information to determine whether the plurality of student loans are from more than one lender. In still another embodiment of the present invention, the qualification module assesses the loan information to determine whether the plurality of student loans are guaranteed by a government-sponsored program. In yet another embodiment of the present invention, the qualification module assesses an aggregate student loan debt of the loan applicant to determine loan qualification. In another aspect of the present invention the qualification module qualifies the loan applicant if an aggregate student loan debt of the loan applicant exceeds a predetermined amount.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2A illustrates an embodiment of an interactive personal information page, resident in the input module and transmissible over the Internet from the web site depicted in FIG. 1, to assist the loan applicant in providing the personal information pertaining to his or her plurality of student loans;

FIG. 2B illustrates an embodiment of an interactive personal information page, resident in the input module and transmissible over the Internet from the web site depicted in FIG. 1, to assist the loan applicant in providing the personal information pertaining to his or her plurality of student loans;

FIG. 3 illustrates an embodiment of an interactive debt information page, resident in the input module and transmissible over the Internet from the web site depicted in FIG. 1, to assist the potential loan applicant in furnishing information regarding his or her plurality of student loans to be considered for consolidation;

FIG. 4 illustrates an embodiment of an interactive debt consolidating information page, resident in the input module and transmissible over the Internet from the web site depicted in FIG. 1, to assist the loan applicant is selecting loans for consolidation from the plurality of student loans.

DETAILED DESCRIPTION

Figure 1:
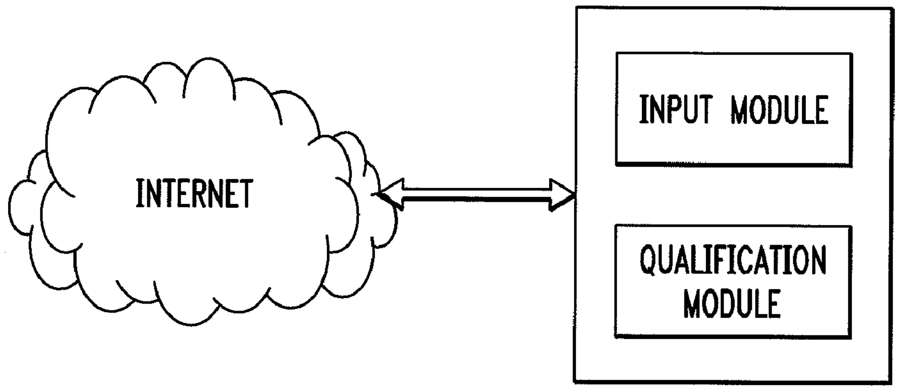
FIG. 1 illustrates a block diagram of an Internet web site constructed according to the principles of the present invention.

Referring initially to FIG. 1, illustrated is a block diagram of an Internet 100 web site 110 constructed in accordance with the principles of the present invention. The Internet 100 provides a loan applicant access to the invention via a web site 110. Located on the web site 110 is the student loan consolidation qualification system that includes an input module 120 and a qualification module 130. Those of ordinary skill in the art will understand that the web site 110 is resident in a server and that the input module 120 and qualification module 130 are coded computer programs in such server. Those of ordinary skill in the art will also understand that the server is connected to the Internet 100 by a telephony connection and that a loan applicant accesses the web site 110 with a computer that is also connected to the Internet 100 by a telephony connection.

The input module 120 presents at least one page on the web site 100 to provide assistance to a loan applicant in furnishing applicable personal and loan information with respect to the loan applicant's student loans. The qualification module 130, in association with the input module 120, assesses the information furnished by the loan applicant to determine if the loan applicant is personally qualified for a consolidated student loan. The qualification module 130 also assesses the information furnished by the loan applicant regarding the student loans to determine if the loans qualify for consolidation. If the qualification module 130 determines that both the personal and loan qualification are positive, the loan applicant and a loan consolidator are so informed by the qualification module 130.

Turning now to FIGS. 2A and 2B, illustrated are embodiments of interactive personal information pages 200, 201, resident in the input module 120 and transmissible over the Internet 100 from the web site 110 depicted in FIG. 1, to assist the loan applicant in providing the personal information pertaining to his or her plurality of student loans. In a Borrower Information 210 portion of the interactive personal information page 200, the loan applicant furnishes his or her name, address, date of birth, email address and phone numbers. The loan applicant is also required to furnish a social security number 211 and drivers license number 212 so that the credit status, as well as the existence, of the loan applicant can be established.

In an Employer Information 220 portion of the interactive personal information page 200 (which carries over to the top of FIG. 2B), the loan applicant is asked to provide identification information about his or her employer. In a Relative 230 portion of the interactive personal information page 201, information regarding the identity, address and phone numbers of a relative who does not live with the loan applicant is requested. Finally, in two Reference portions 240, the loan applicant is required to furnish information regarding two references that can be contacted in order to secure information about the loan applicant.

Referring now to FIG. 3, illustrated is an embodiment of an interactive debt information page 300, resident in the input module 120 and transmissible over the Internet 100 from the web site 110 depicted in FIG. 1, to assist the loan applicant in furnishing information regarding his or her plurality of student loans to be considered for consolidation. Shown on the illustrated embodiment is a Debt Minder Worksheet 310 where information regarding each student loan entered by the loan applicant is summarized. Information about each student loan is entered by the loan applicant on a loan information worksheet 320. After the required fields on the loan information worksheet 320 with respect to a particular student loan are completed, the loan applicant clicks the Add Loan button 325 to add information about the loan to the Debt Minder Worksheet 310. When the loan applicant has entered information about all of his or her plurality of student loans, the loan applicant proceeds to the next page on the web site 110 by clicking a continue button 330.

Turning now to FIG. 4, illustrated is an embodiment of an interactive debt consolidating information page 400, resident in the input module 120 and transmissible over the Internet 100 from the web site 110 depicted in FIG. 1, to assist the loan applicant is selecting loans for consolidation from the plurality of student loans. On the debt consolidating information page 400, the loan applicant selects student loans for consolidation by checking a consolidation box 410 on a worksheet 420 displaying the plurality of student loans. In order to assist the loan applicant, this embodiment of the invention displays a loan balance information box 430, a maximum term repayment box 440, and a weighted interest rate information box 450, all of which provide relevant information to the loan applicant based on the loans selected for consolidation. The loan applicant then selects a repayment plan selection by clicking on one of a number of repayment options 460 displayed. The loan applicant is thus permitted to select the most affordable alternative to repay the consolidated student loan.

Figure 5:
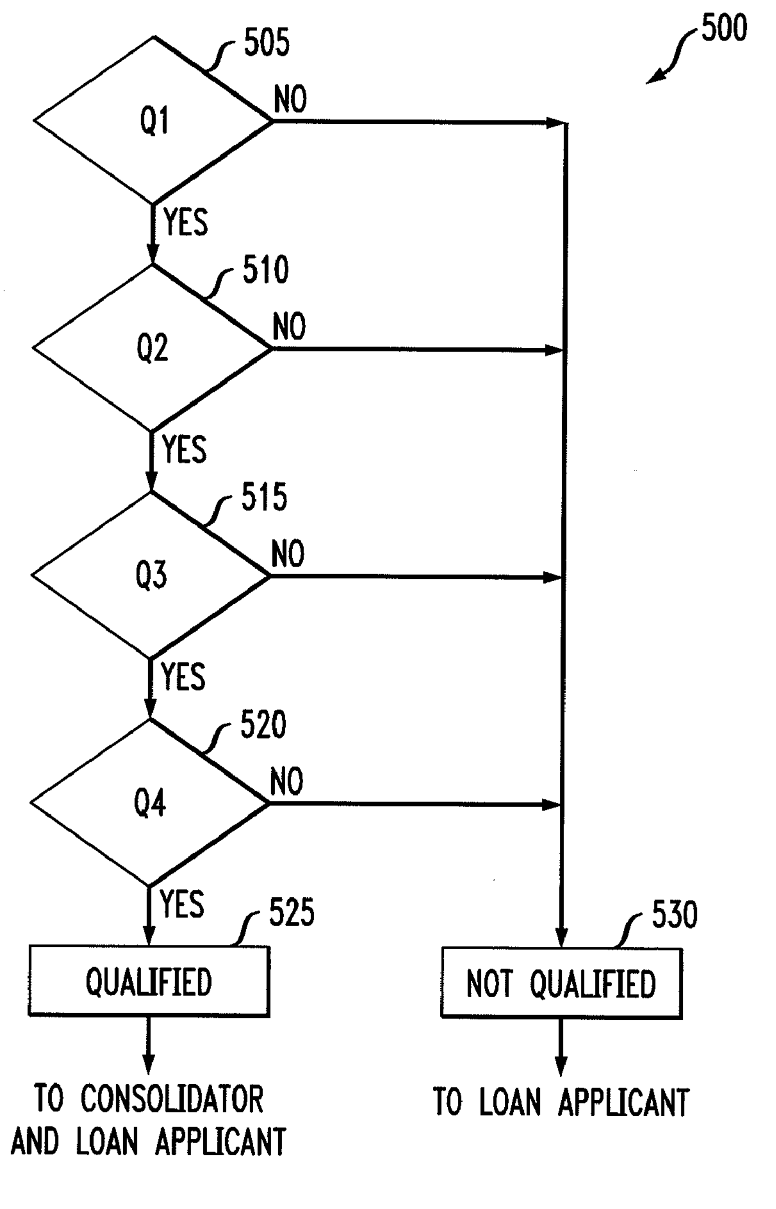
FIG. 5 illustrates a flow diagram of one embodiment of a qualification method used by the qualification module, in accordance with the principles of the present invention, to qualify a loan applicant for a consolidated student loan.

Turning now to FIG. 5, illustrated is a flow diagram of one embodiment of a qualification method 500 used by the qualification module 130, in accordance with the principles of the present invention, to qualify a loan applicant for a consolidated student loan. As described above, the qualification module 130, in association with the input module 120, assesses information entered by the loan applicant to determine whether the loan applicant is qualified to receive a consolidated student loan. The illustrated embodiment sets forth one method for the qualification module 130 to qualify the applicant and his or her loans. Those skilled in the art will readily understand that other methods can be used by the qualification module 130 and still be within the intended scope of the present invention.

In the illustrated embodiment, the qualification method 500, in a first question 505, asks whether the loan applicant is a student or former student with a plurality of student loans. If the answer is “no”, the method 500 determines the loan applicant is not personally qualified for a consolidated student loan and, in a not qualified step 530, so informs the loan applicant. If the answer is “yes”, the qualification method 500 proceeds to ask a second question 510. In a second question 510, the method 500 asks if the plurality of student loans involves more than one lender. If the answer is “no”, the qualification method 500 determines the student loans are not qualified to be consolidated and informs the loan applicant in a not qualified step 530. If the answer is “yes”, the qualification method 500 continues.

The second question 510, in the illustrated embodiment of the invention, requires the plurality of student loans to involve more than one lender. This is a useful screening mechanism that benefits both the loan applicant and the third party lender making consolidation loan. If the student loans are all from the same lender, it may not be economical for a third party lender to consolidate the loans because the original lender should be able to offer, in most cases, better terms to the loan applicant. The embodiment keeps the third party lender from going through a qualification procedure for a loan that the lender can not competitively offer and, indirectly, suggests to the loan applicant that he or she can receive better terms by applying to the lender that made the original loans.

Returning to the illustrated qualification method 500, in a third question 515, the method asks if more than one of the plurality of student loans is guaranteed by a government sponsored program. If the answer is “no”, the method 500 determines the student loans are not qualified to be consolidated and informs the loan applicant in a not qualified step 530. If the answer is “yes”, the qualification method 500 continues.

The qualification method 500 asks, in a fourth question 520, if the aggregate amount of student debt to be consolidated exceeds a predetermined amount. If the answer is “no”, the qualification method 500 concludes the student loans are not qualified to be consolidated and, in a not qualified step 530, notifies the loan applicant. If the answer is “yes”, the qualification method 500 concludes the loans are qualified to be consolidated and, in a qualified step 525, informs the loan applicant and a loan consolidator. It is then left up to the loan applicant and loan consolidator to proceed with the details necessary to consolidate the plurality of student loans.

Those skilled in the pertinent art will understand that other embodiments of the method of qualifying a plurality of student loans for consolidation can be incorporated in the foregoing method 500 and still be within the intended scope of the present invention. For example, in one embodiment of the invention, the system is associated with a web site of an affinity group. For example, the invention could theoretically be associated with the web site owned by the American Bar Association. In such an embodiment, the input module would, at some time during the qualification process, ask whether the loan applicant was a member of the American Bar Association. If the answer was “no”, the qualification module would determine that the loan applicant is not qualified to have his or her student loans consolidated by filing an application on that Internet site. If the answer is “yes”, the qualification module would proceed in determining whether the loan applicant and the loans are otherwise qualified to be consolidated as herein set forth. Such an embodiment is advantageous to the members of the affinity group, such as, in this example, members of the American Bar Association, because the affinity group will normally check out the suitability of the party offering to consolidate loans before permitting such party to put information on its web site. In still another embodiment, the Internet site is a secured site.

In another useful embodiment of the invention, the input module will include assisting in the gathering of information if the student loan is guaranteed. By gathering loan guarantor information, such information can be assessed by the qualification module to determine the qualification of the plurality of student loans for consolidation.

Those skilled in the pertinent art will understand that the invention described herein can be used with a local network, either online or, by downloading the requisite information, offline, and still be within the intended scope of the present invention. In addition, the invention described herein can be used from a remote location in connection with a local network and still be within the intended scope of the present invention.

Although the present invention has been described in detail, those skilled in the art should understand that they can make various changes, substitutions and alterations herein without departing from the spirit and scope of the invention in its broadest form.

What is claimed is:

1. A computer system for student loan consolidation qualification, comprising:

an input module embodied in software in said computer system and associated with an Internet site, that presents at least one page to a loan applicant to assist said loan applicant in providing personal and student loan information pertaining to a plurality of student loans made to said loan applicant; and a qualification module embodied in software in said computer system and associated with said input module, that (a) assesses said personal information to determine a personal qualification of said loan applicant, (b) assesses said student loan information pertaining to said plurality of student loans, and (c) assesses an aggregate student loan debt of said loan applicant to determine a loan qualification of said loan applicant, said qualification module qualifying said loan applicant and informing said loan applicant and a loan consolidator only if said personal qualification and said loan qualification are positive.

2. The system as recited in claim 1 wherein said site is associated with an affinity group.

3. The system as recited in claim 1 wherein said personal information includes student loan guarantor information.

4. The system as recited in claim 1 wherein said qualification module assesses said student loan information to determine whether said plurality of student loans are from more than one lender to determine said loan qualification.

5. The system as recited in claim 1 wherein said qualification module assesses said student loan information to determine whether said plurality of student loans are guaranteed by a government-sponsored program.

6. The system as recited in claim 1 wherein said qualification module qualifies said loan applicant if an aggregate student loan debt of said loan applicant exceeds a predetermined amount.

7. A method of qualifying a student for student loan consolidation, comprising:

presenting, at an Internet site, at least one page to a loan applicant to assist said loan applicant in providing personal and student loan information pertaining to a plurality of student loans made to said loan applicant;

assessing said personal information to determine a personal qualification of said loan applicant;

assessing said student loan information pertaining to said plurality of student loans to determine a loan qualification of said loan applicant including assessing an aggregate student loan debt of said loan applicant;

qualifying said loan applicant only if said personal qualification and said loan qualification are positive; and informing said loan applicant and a loan consolidator if said personal qualification and said loan qualification are positive.

8. The method as recited in claim 7 wherein said site is associated with an affinity group.

9. The method as recited in claim 7 wherein said personal information includes student loan guarantor information.

10. The method as recited in claim 7 wherein said assessing said student loan information comprises determining whether said plurality of student loans are from more than one lender to determine said loan qualification.

11. The method as recited in claim 7 wherein said assessing said student loan information comprises determining whether said plurality of student loans are guaranteed by a government-sponsored program.

12. The method as recited in claim 7 wherein said qualifying comprises qualifying said loan applicant if an aggregate student loan debt of said loan applicant exceeds a predetermined amount.

13. A computer system for operating a student loan consolidation qualification Internet site, comprising:

an input module embodied in software in said computer system and associated with said Internet site, that presents at least one page to a loan applicant to assist said loan applicant in providing personal and student loan information pertaining to a plurality of student loans made to said loan applicant; and a qualification module embodied in software in said computer system and associated with said input module, that assesses said personal information to determine a personal qualification of said loan applicant and assesses said student loan information pertaining to said plurality of student loans to determine a loan qualification of said loan applicant including assessing an aggregate student loan debt of said loan applicant, said qualification module qualifying said loan applicant and informing said loan applicant and a loan consolidator via a page on said site only if said personal qualification and said loan qualification are positive.

14. The site as recited in claim 13 wherein said site is associated with an affinity group.

15. The site as recited in claim 13 wherein said personal information includes student loan guarantor information.

16. The site as recited in claim 13 wherein said qualification module assesses said student loan information to determine whether said plurality of student loans are from more than one lender to determine said loan qualification.

17. The site as recited in claim 13 wherein said qualification module assesses said student loan information to determine whether said plurality of student loans are guaranteed by a government-sponsored program.

18. The site as recited in claim 13 wherein said qualification module qualifies said loan applicant if an aggregate student loan debt of said loan applicant exceeds a predetermined amount.

* * * * *

UNITED STATES PATENT AND TRADEMARK OFFICE

CERTIFICATE OF CORRECTION

PATENT NO. : 7,574,401 B1
APPLICATION NO. : 09/603510
DATED : August 11, 2009
INVENTOR(S) : Arthur Dale Burns It is certified that error appears in the above-identified patent and that said Letters Patent is hereby corrected as shown below:

In title page, item (73) Assignee, delete “Arthur Dale Burns, St. Petersburg, FL (US)” and insert --UnitedHealth Group Incorporated, Minnetonka, MN (US)-- therefor.

Signed and Sealed this

Twenty-fourth Day of November, 2009

David J. Kappos

*Director of the United States Patent and Trademark Office*

UNITED STATES PATENT AND TRADEMARK OFFICE

CERTIFICATE OF CORRECTION

PATENT NO. : 7,574,401 B1
APPLICATION NO. : 09/603510
DATED : August 11, 2009
INVENTOR(S) : Arthur Dale Burns It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,245 days.

Signed and Sealed this

Nineteenth Day of October, 2010

David J. Kappos
*Director of the United States Patent and Trademark Office*